(12) United States Patent
Udagawa

(10) Patent No.: US 7,973,829 B2
(45) Date of Patent: Jul. 5, 2011

(54) IMAGE SENSING APPARATUS, IMAGE SENSING METHOD, RECORDING MEDIUM, AND PROGRAM FOR CONTROLLING EXPOSURE BY CORRECTING A BRIGHTNESS VALUE WHEN AN OPTICAL FILTER IS MANUALLY INSERTED

(75) Inventor: Yoshiro Udagawa, Tochigi (JP)

(73) Assignee: Canon Kabushiki Kaisha, Tokyo (JP)

( * ) Notice: Subject to any disclaimer, the term of this patent is extended or adjusted under 35 U.S.C. 154(b) by 1633 days.

(21) Appl. No.: 10/660,096

(22) Filed: Sep. 10, 2003

(65) Prior Publication Data

US 2004/0046872 A1 Mar. 11, 2004

(30) Foreign Application Priority Data

Sep. 10, 2002 (JP) .................................. 2002-264310

(51) Int. Cl.
*H04N 9/73* (2006.01)
*H04N 9/083* (2006.01)

(52) U.S. Cl. ...................... 348/224.1; 348/270; 396/209

(58) Field of Classification Search ............... 348/221.1, 348/224.1, 227.1, 257, 270
See application file for complete search history.

(56) References Cited

U.S. PATENT DOCUMENTS

| | | | |
|---|---|---|---|
| 5,319,449 A | | 6/1994 | Saito et al. |
| 5,479,298 A | * | 12/1995 | Yanagi et al. ................. 359/888 |
| 5,900,947 A | * | 5/1999 | Kenmochi et al. ............ 358/442 |
| 6,078,442 A | * | 6/2000 | Tada et al. ...................... 359/890 |
| 6,839,087 B1 | * | 1/2005 | Sato .............................. 348/362 |
| 7,199,830 B1 | * | 4/2007 | Tanaka et al. ................. 348/362 |
| 2002/0118971 A1 | * | 8/2002 | Takahashi ...................... 396/429 |
| 2004/0130653 A1 | * | 7/2004 | Nanjo et al. ................... 348/363 |
| 2005/0041117 A1 | * | 2/2005 | Yamagishi ................. 348/231.2 |
| 2005/0225662 A1 | * | 10/2005 | Tsuda et al. ................... 348/360 |

FOREIGN PATENT DOCUMENTS

| | | |
|---|---|---|
| JP | 02-042426 | 2/1990 |
| JP | 05-007369 | 1/1993 |
| JP | 11-239295 | 8/1999 |
| JP | 2001-222039 | 8/2001 |

OTHER PUBLICATIONS

Japanese Office Action dated Aug. 12, 2008 for counter part Japanese Application No. 2002-264310.

* cited by examiner

*Primary Examiner* — Hung H Lam

(74) *Attorney, Agent, or Firm* — Cowan, Liebowitz & Latman, P.C.

(57) ABSTRACT

An object of the invention is to provide an image sensing apparatus capable of sensing an image in consideration of the influence of inserting/removing an optical filter, an image sensing method, a recording medium, and a program. To achieve this object, a brightness value calculation unit calculates the first brightness value representing the brightness of part or all of an object which is imaged on a CCD image sensing element. A brightness value correction unit calculates the second brightness value by correcting the first brightness value calculated by the brightness value calculation unit on the basis of the light reduction amount generated by inserting an ND filter. A system controller controls an optical system and signal processing in a DSP circuit by using the second brightness value calculated by the brightness value correction unit.

19 Claims, 5 Drawing Sheets

ND FILTER : OFF

ND FILTER : ON

IMAGE SENSING APPARATUS, IMAGE SENSING METHOD, RECORDING MEDIUM, AND PROGRAM FOR CONTROLLING EXPOSURE BY CORRECTING A BRIGHTNESS VALUE WHEN AN OPTICAL FILTER IS MANUALLY INSERTED

FIELD OF THE INVENTION

The present invention relates to an image sensing apparatus and, more particularly, to an image sensing apparatus having a removable light-reducing optical filter, an image sensing method, a recording medium, and a program.

BACKGROUND OF THE INVENTION

In an image sensing apparatus such as a digital camera, only an aperture mechanism for changing the aperture diameter is conventionally set. If the aperture is stopped down too much in order to widen the photographing brightness range up to a bright object, so-called diffraction occurs, decreasing the resolution. To solve this, there is recently provided an image sensing apparatus having an ND (Neutral Density) filter as a removable light-reducing optical filter. The ND filter is an optical filter with nonselective transmittance that almost uniformly transmits (reduces) wavelengths in the visible spectra of a beam.

In the signal processing circuit of the image sensing apparatus that generates image data, signal processing based on the brightness value for forming an image on an image sensing element is not changed in accordance with insertion/removal of the ND filter, posing the following problems.

In general, a brightness value Bv is calculated as a value obtained by subtracting the speed value (Sv) of an image sensing element from the sum of the aperture value (Av) and time value (Tv):

$$Bv = Av + Tv - Sv \tag{1}$$

For example, assuming that correct exposure can be obtained at an F-number of F5.6 (Av=5), a shutter speed of 1/1000 (Tv=10), and film speed of ISO 100 (Sv=5), the brightness value Bv=5+10−5=10 is calculated from equation (1). The image sensing apparatus transfers the brightness value calculated using equation (1) to a circuit block which performs various signal processes on the basis of the brightness value. The circuit block includes a WB (White Balance) processing block which follows a change in color temperature, and an exposure value setting calculation block which calculates an aperture value, shutter speed, and the like to set an exposure value. With these blocks, the image sensing apparatus realizes an automatic white balance function, automatic exposure function, and the like.

When the ND filter is inserted, a conventional image sensing apparatus does not consider the influence of the inserted ND filter in calculating the brightness value (or exposure value). For example, assuming that correct exposure is obtained at the neutral density ND of the inserted ND filter=3, the F-number and shutter speed are F5.6 (Av=5) and 1/128 (Tv=7), respectively. The image sensing apparatus calculates the brightness value Bv=5+7−5=7 in accordance with equation (1). That is, the image sensing apparatus determines that the brightness value has merely decreased (without using any ND filter), and thus transfers the brightness value to the WB processing block or exposure value setting calculation block.

A concrete example of WB processing will be explained with reference to FIG. 4. FIG. 4 is a graph showing conventional WB processing. In FIG. 4, the ordinate represents a fluorescent lamp degree Cy which is a value representing the degree of possibility that the light source is a fluorescent lamp. The abscissa represents a color temperature Cx. The curve in FIG. 4 is a WB white axis which is a target line to be followed upon a change in color temperature. The dotted line in FIG. 4 represents a WB setting range which sets a range where the WB white axis is followed. The WB processing block generally uses the brightness value Bv in photographing as one control parameter. For example, photographing at a large brightness value Bv is determined as outdoor photographing, and WB processing is so restricted as to cope with a low color temperature. To the contrary, photographing at a small brightness value Bv is determined as indoor photographing is determined as indoor photographing in which an object is illuminated with tungsten light or a fluorescent lamp, and WB processing is so restricted as to cope with a high color temperature. In this way, the influence of a color object is suppressed. In WB processing based on the brightness, if the calculation value of the brightness value Bv changes for the same object, WB processing also changes, failing to obtain image data by WB processing optimal for the object.

A concrete example of exposure value setting processing will be explained with reference to FIG. 5. FIG. 5 is a graph showing conventional exposure value setting processing. In FIG. 5, the ordinate represents the brightness of an adjusted image which is the exposure value of the image sensing apparatus. The abscissa represents the brightness value Bv. In exposure value setting processing, as shown in FIG. 5, high-brightness luminance increasing processing of increasing the exposure value for a large brightness value Bv (e.g., Bv value=8 to 9 or more) is performed. More specifically, when the brightness value Bv is large, an atmospheric scene is often obtained by relatively brightly reproducing an image at a summer seaside, winter skiing ground, or the like. For this reason, the exposure value is set slightly large for a large brightness value Bv, as indicated by the arrow in FIG. 5. If the calculation value of the brightness value Bv changes for the same object, the high-brightness luminance increase amount also changes. Image data by exposure value setting processing optimal for the object cannot be attained.

As described above, if the calculation value of the brightness value Bv changes upon insertion/removal of the optical filter (ND filter) even for the same object, processes using the brightness value Bv, such as generation of an optical system control signal and control of signal processing in a signal processing circuit, are no longer optimal for the object.

SUMMARY OF THE INVENTION

The present invention has been made to overcome the conventional drawbacks, and has as its object to provide an image sensing apparatus capable of sensing an image in consideration of the influence of inserting/removing an optical filter, an image sensing method, a recording medium, and a program.

To solve the above problems, according to the first aspect of the present invention, an image sensing apparatus having at least a filter insertion/removal device which inserts and removes an optical filter for reducing a light quantity to an image sensing element serving as an optical system is characterized by comprising a signal processing device which performs signal processing so as to generate image data from an image sensing signal output from the image sensing element, a brightness value calculation device which calculates a first brightness value representing a brightness of part or all of an object which is imaged on the image sensing element, a brightness value correction device which calculates a second brightness value by correcting the first brightness value on the basis of a light reduction amount generated by inserting the optical filter by the filter insertion/removal device, and a control device which controls the optical system and/or the signal processing in the signal processing device by using the second brightness value.

According to the second aspect of the present invention, an image sensing method using an image sensing apparatus having at least a filter insertion/removal device which inserts and removes an optical filter for reducing a light quantity to an image sensing element serving as an optical system is characterized by comprising a first step of calculating a first brightness value representing a brightness of part or all of an object which is imaged on the image sensing element, a second step of calculating a second brightness value by correcting the first brightness value calculated in the first step on the basis of a light reduction amount generated by inserting the optical filter by the filter insertion/removal device, and a third step of controlling, by using the second brightness value calculated in the second step, the optical system and/or signal processing of generating image data from an image sensing signal output from the image sensing element.

According to the third aspect of the present invention, there is provided a computer-readable recording medium which records a program for controlling an image sensing apparatus having at least a filter insertion/removal device which inserts and removes an optical filter for reducing a light quantity to an image sensing element serving as an optical system, the program causing a computer in the image sensing apparatus to execute a first step of calculating a first brightness value representing a brightness of part or all of an object which is imaged on the image sensing element, a second step of calculating a second brightness value by correcting the first brightness value calculated in the first step on the basis of a light reduction amount generated by inserting the optical filter by the filter insertion/removal device, and a third step of controlling, by using the second brightness value calculated in the second step, the optical system and/or signal processing of generating image data from an image sensing signal output from the image sensing element.

According to the fourth aspect of the present invention, there is provided a program which controls an image sensing apparatus having at least a filter insertion/removal device which inserts and removes an optical filter for reducing a light quantity to an image sensing element serving as an optical system, the program causing a computer in the image sensing apparatus to execute a first step of calculating a first brightness value representing a brightness of part or all of an object which is imaged on the image sensing element, a second step of calculating a second brightness value by correcting the first brightness value calculated in the first step on the basis of a light reduction amount generated by inserting the optical filter by the filter insertion/removal device, and a third step of controlling, by using the second brightness value calculated in the second step, the optical system and/or signal processing of generating image data from an image sensing signal output from the image sensing element.

According to the image sensing apparatus, image sensing method, recording medium, and program of the present invention, the first brightness value representing the brightness of part or all of an object which is imaged on the image sensing element is calculated. The second brightness value is calculated by correcting the calculated first brightness value on the basis of the light reduction amount generated by inserting the optical filter. Control of the optical system and/or control of signal processing of generating image data from an image sensing signal output from the image sensing element is performed using the second brightness value. An image can be sensed in consideration of the light reduction amount generated by inserting the optical filter. That is, an image can be sensed in consideration of the influence of inserting/removing the optical filter.

Other objects and advantages besides those discussed above shall be apparent to those skilled in the art from the description of a preferred embodiment of the invention which follows. In the description, reference is made to accompanying drawings, which form a part hereof, and which illustrate an example of the invention. Such example, however, is not exhaustive of the various embodiments of the invention, and therefore reference is made to the claims which follow the description for determining the scope of the invention.

DETAILED DESCRIPTION OF THE PREFERRED EMBODIMENT

A preferred embodiment of the present invention will be described below with reference to the accompanying drawings.

Figure 1:
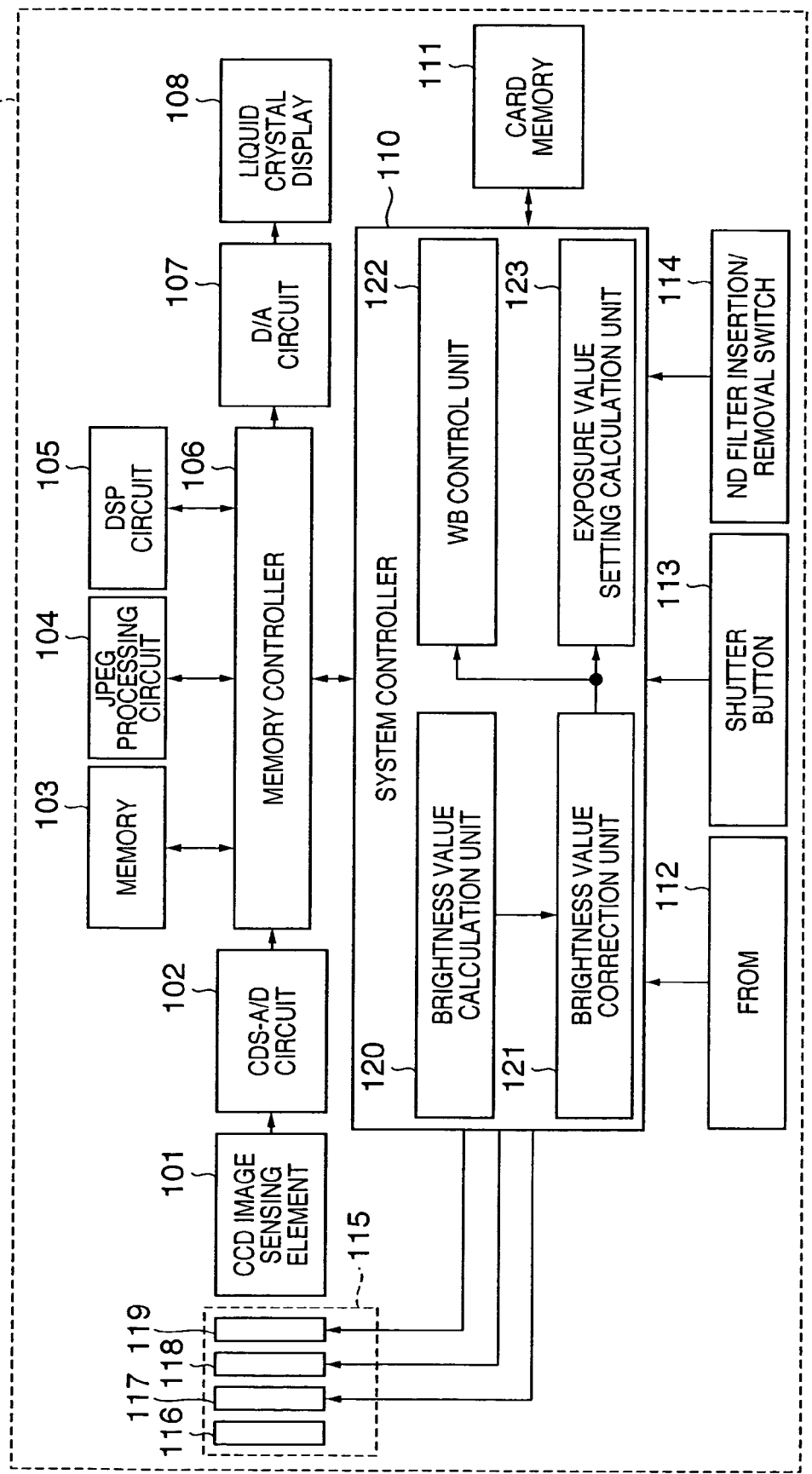
FIG. 1 is a block diagram showing the arrangement of an image sensing apparatus according to an embodiment of the present invention.

FIG. 1 is a block diagram showing the arrangement of an image sensing apparatus according to the embodiment of the present invention. In FIG. 1, reference numeral 100 denotes an image sensing apparatus such as a digital still camera which has a function of inserting and removing an ND filter (optical filter) 114 for reducing the light quantity to a CCD (Charge Coupled Device) image sensing element 101 (to be described later) serving as an optical system. The image sensing apparatus 100 also has an automatic white balance function and automatic exposure control function. The internal arrangement of the image sensing apparatus 100 will be explained.

The CCD image sensing element 101 is a semiconductor light-receiving element which converts light into an electrical signal and outputs a CCD output signal (image sensing signal). Reference numeral 102 denotes a CDS (Correlated Double Sampling)-A/D converter which samples a CCD output signal (analog signal) output from the CCD image sensing element 101 and converts the signal into image sensing data (digital signal). Reference numeral 103 denotes a memory which is a recording medium for temporarily saving the above-mentioned image sensing data, and data during processing and image data processed by a JPEG processing circuit 104 and DSP circuit 105 (to be described later) under the control of a memory controller 106 (to be described later). The JPEG (Joint Photographic Experts Group) processing circuit 104 performs JPEG compression processing for image data (uncompressed) input from the memory controller 106

(to be described later), and outputs the JPEG-compressed image data (to be referred to as JPEG image data hereinafter).

The DSP (Digital Signal Processing) circuit 105 performs signal processing such as luminance signal processing and color signal processing on the basis of image sensing data input from the memory controller 106 (to be described later), and outputs image data (uncompressed).

The memory controller 106 controls the data flow via the memory 103 by storing image sensing data input from the CDS-A/D circuit 102 in the memory 103 or storing in the memory 103 image data during processing or image data processed by the JPEG processing circuit 104 or DSP circuit 105. Reference numeral 107 denotes a D/A circuit which converts image data output from the memory controller 106 into an analog video signal. Reference numeral 108 denotes a liquid crystal display which displays an image on the basis of the analog video signal output from the D/A circuit 107. The liquid crystal display 108 displays an object image currently formed on the image sensing plane of the CCD image sensing element 101 when the image sensing apparatus 100 is in the photographing mode, and displays the reproduced image of image data which was photographed in the past and is stored in a card memory 111 (to be described later) when the image sensing apparatus 100 is in the reproduction mode.

Reference numeral 110 denotes a system controller (control device) which controls the whole image sensing apparatus 100. The system controller 110 comprises a plurality of processing units which realize the automatic white balance processing function and automatic exposure control processing function. These processing units will be described in detail. The card memory 111 is a recording medium which stores final image data (JPEG image data described above). The card memory 111 is preferably a nonvolatile memory which allows the system controller 110 to write and read out JPEG image data and is detachable from the image sensing apparatus 100.

Reference numeral 112 denotes an FROM which is a recording medium for storing firmware data. Reference numeral 113 denotes a shutter button for designating the photographing timing of the image sensing apparatus 100 as a digital still camera. Reference numeral 114 denotes an ND filter insertion/removal switch which controls an ND filter mechanism (to be described later) so as to insert the ND filter into and remove it from the optical axis of the optical system. The ND filter is inserted (to be referred to as ND filter is ON hereinafter) when the ND filter insertion/removal switch 114 is ON, and is removed (to be referred to as ND filter is OFF hereinafter) when the switch 114 is OFF.

Reference numeral 115 denotes an optical system which comprises a lens 116 (to be described later) and the like, and forms an object image on the image sensing plane of the CCD image sensing element 101. Reference numeral 117 denotes an aperture & control mechanism (to be referred to as an aperture mechanism 117 hereinafter) which adjusts the quantity of light passing through the lens 116 by the aperture. Reference numeral 118 denotes an ND filter & insertion/removal mechanism (to be referred to as an ND filter mechanism 118 hereinafter) which inserts/removes an ND filter for reducing the light quantity to the CCD image sensing element 101. Reference numeral 119 denotes a shutter & control mechanism (to be referred to as a shutter mechanism 119 hereinafter) which controls a time during which an object image is formed on the CCD image sensing element 101 by opening/closing the shutter. The lens 116, aperture mechanism 117, ND filter mechanism 118, and shutter mechanism 119 constitute the optical system 115 of the image sensing apparatus 100, but the optical system 115 is not limited to them. For example, the shutter mechanism 119 may be omitted, and an electronic shutter which controls the charge storage time in the CCD image sensing element 101 may be adopted.

The processing units of the system controller 110 will be described. Reference numeral 120 denotes a brightness value calculation unit which calculates the first brightness value Bv by using the above-described equation (1) based on the aperture value Av determined in accordance with the aperture diameter of the aperture mechanism 117, the time value Tv determined in accordance with the shutter speed of the shutter mechanism 119, and the speed value Sv of the CCD image sensing element 101.

Reference numeral 121 denotes a brightness value correction unit which calculates the second brightness value Bv' by correcting the first brightness value Bv calculated by the brightness value calculation unit 120 on the basis of the light reduction amount (in this embodiment, neutral density ND=3) generated when the ND filter insertion/removal switch 114 is turned on and the ND filter mechanism 118 inserts the ND filter into the optical path. When the ND filter is removed, the brightness value correction unit 121 directly outputs the first brightness value Bv calculated by the brightness value calculation unit 120 without correcting the first brightness value Bv. The system controller 110 uses the first brightness value Bv or second brightness value Bv' for white balance processing or exposure value setting calculation processing.

Reference numeral 122 denotes a WB control unit which outputs a white balance control value so as to perform desired white balance processing in color signal processing by the DSP circuit 105 on the basis of the first brightness value Bv output from the brightness value calculation unit 120 or the second brightness value Bv' output from the brightness value correction unit 121 and the balance of R, G, B values of image data. The DSP circuit 105 executes white balance processing on the basis of the white balance control value.

Reference numeral 123 denotes an exposure value setting calculation unit which outputs a control signal for controlling the optical system 115 in accordance with the first brightness value Bv output from the brightness value calculation unit 120 or the second brightness value Bv' output from the brightness value correction unit 121 and the exposure value of the CCD image sensing element 101 and controlling the exposure value to the CCD image sensing element 101. The exposure value of the CCD image sensing element 101 is calculated by the system controller 110.

Each processing unit in the system controller 110 in FIG. 1 may be implemented by dedicated hardware. Alternatively, the processing unit may be constituted by a memory and CPU, and a program for realizing the function of the processing unit may be loaded into the memory to realize the function.

The memory is comprised of a nonvolatile memory (e.g., hard disk device, magnetooptical disk device, or flash memory), a read-only recording medium (e.g., a CD-ROM), a volatile memory (e.g., RAM (Random Access Memory)), or a computer-readable/writable recording medium as a combination of them.

Photographing operation (when no ND filter is inserted) of the image sensing apparatus 100 will be described. That is, the operation of the image sensing apparatus 100 when the shutter button 113 is pressed will be explained. An object image is formed on the image sensing plane of the CCD image sensing element 101 via the optical system 115. The exposure value is controlled to a proper value by the system controller 110 by adjusting the light quantity by the aperture mechanism 117 and controlling the charge storage time by the shutter mechanism 119 in photoelectric conversion of the CCD image sensing element 101. An electrical signal generated by photoelectric conversion in the CCD image sensing element 101 is output as a CCD output signal to the CDS-A/D circuit 102. The CDS-A/D circuit 102 samples the input CCD output signal, converts it into a digital signal (to be referred to as image sensing data hereinafter), and outputs the digital signal to the memory controller 106.

The memory controller 106 saves one image of input image sensing data (image of one frame) in the memory 103. The memory controller 106 reads out image sensing data from the memory 103, and inputs it to the DSP circuit 105. The DSP circuit 105 performs signal processing for the image sensing data, and outputs image data containing a pixel value which specifies the brightness and color of each pixel. Note that the pixel value is data of each pixel which constitutes uncompressed image data formed from the luminance and color difference data or from R, G, and B values. The DSP circuit 105 executes white balance processing in accordance with a control signal from the WB control unit 122 of the system controller 110.

The memory controller 106 supplies the image data output from the DSP circuit 105 to the liquid crystal display 108 via the D/A circuit 107. As a result, an image photographed by correct exposure and correct white balance is displayed on the liquid crystal display 108. The user of the image sensing apparatus 100 can confirm the sensed image.

Also, the memory controller 106 supplies the image data output from the DSP circuit 105 to the JPEG circuit 104. The JPEG circuit 104 compresses the image data output from the DSP circuit 105, and outputs the JPEG image data. The system controller 110 stores the JPEG image data output from the JPEG processing circuit 104 in the card memory 111 via the memory controller 106 and an I/F.

The exposure value setting calculation unit 123 calculates setting values for aperture control by the aperture mechanism 117 and shutter control by the shutter mechanism 119 in accordance with the exposure value calculation processing result of the system controller 110. The system controller 110 generates and outputs an aperture control signal for controlling the aperture mechanism 117, a shutter control signal for controlling the shutter mechanism 119, and a driver signal for controlling a CCD driver circuit which drives the CCD image sensing element 101. The system controller 110 also controls the memory controller 106.

As described above, the image sensing apparatus 100 generates JPEG image data at a proper exposure value and white balance in response to pressing of the shutter button 113, and stores the JPEG image data in the card memory 111.

Photographing operation when the ND filter is ON in the image sensing apparatus 100 shown in FIG. 1 will be explained with reference to the accompanying drawings.

Figure 2:
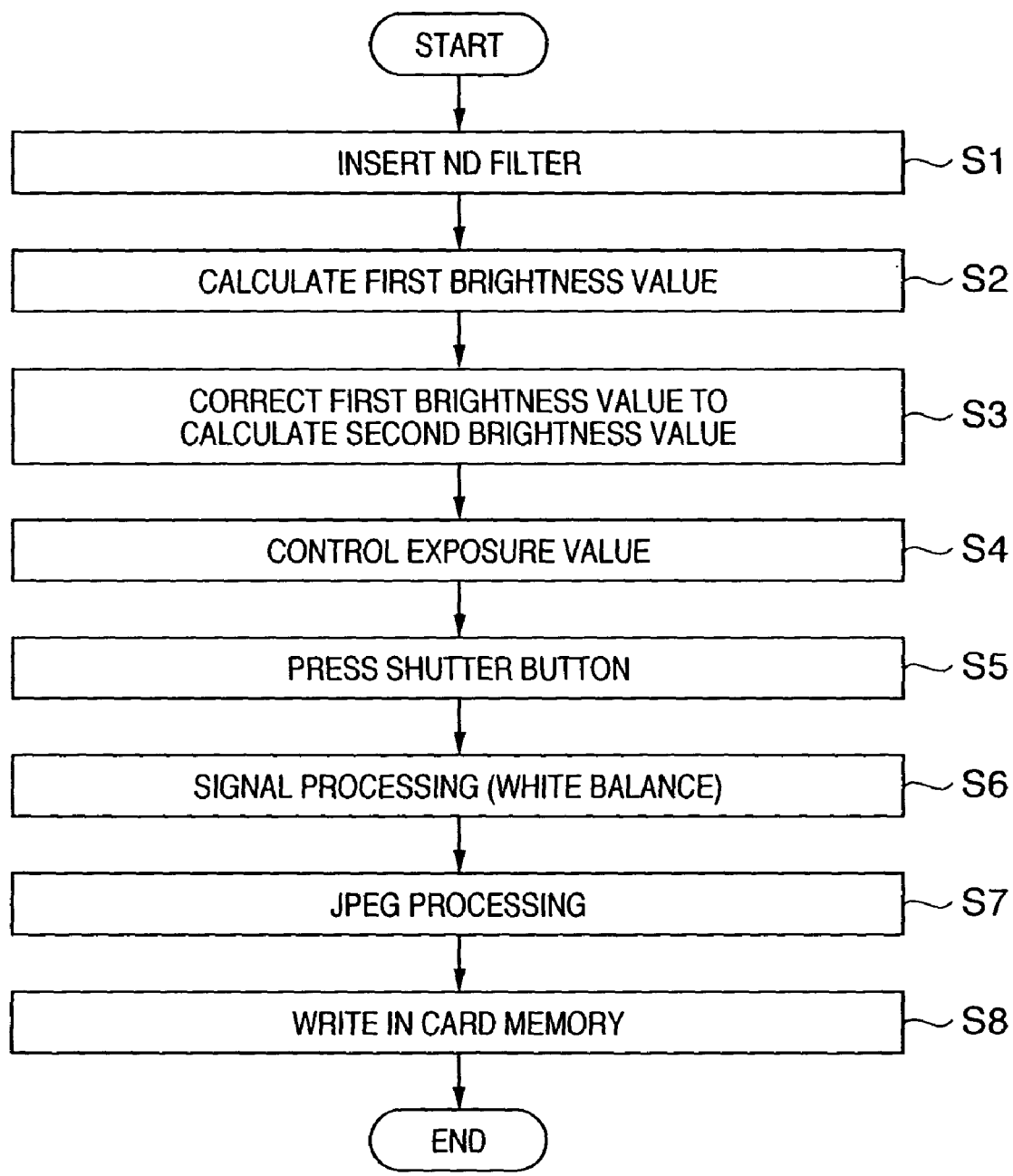
FIG. 2 is a flow chart showing photographing operation when an ND filter is ON in an image sensing apparatus 100 shown in FIG. 1.

FIG. 2 is a flow chart showing photographing operation when the ND filter is ON in the image sensing apparatus 100 shown in FIG. 1. The user of the image sensing apparatus 100 turns on the ND filter insertion/removal switch 114. The system controller 110 which has received an ND filter ON command from the ND filter insertion/removal switch 114 controls the ND filter mechanism 118 to insert the ND filter into the optical axis of the optical system 115 (step S1). This reduces the light quantity which reaches the CCD image sensing element 101. At this time, the system controller 110 controls the optical system 115 so as to keep the exposure value constant.

The brightness value calculation unit 120 calculates the first brightness value Bv by using equation (1) and the aperture value Av, time value Tv, and speed value Sv which can be specified from the state of the optical system 115 (step S2). In order to correct a decrease in light quantity caused by insertion of the ND filter into the optical axis, the brightness value correction unit 121 calculates the second brightness value Bv' by correcting the first brightness value Bv calculated by the brightness value calculation unit 120 on the basis of the light reduction amount generated by the inserted ND filter:

$$Bv'=Bv-(-ND) \tag{2}$$

where the variable ND is the neutral density of the ND filter.

Figure 4:
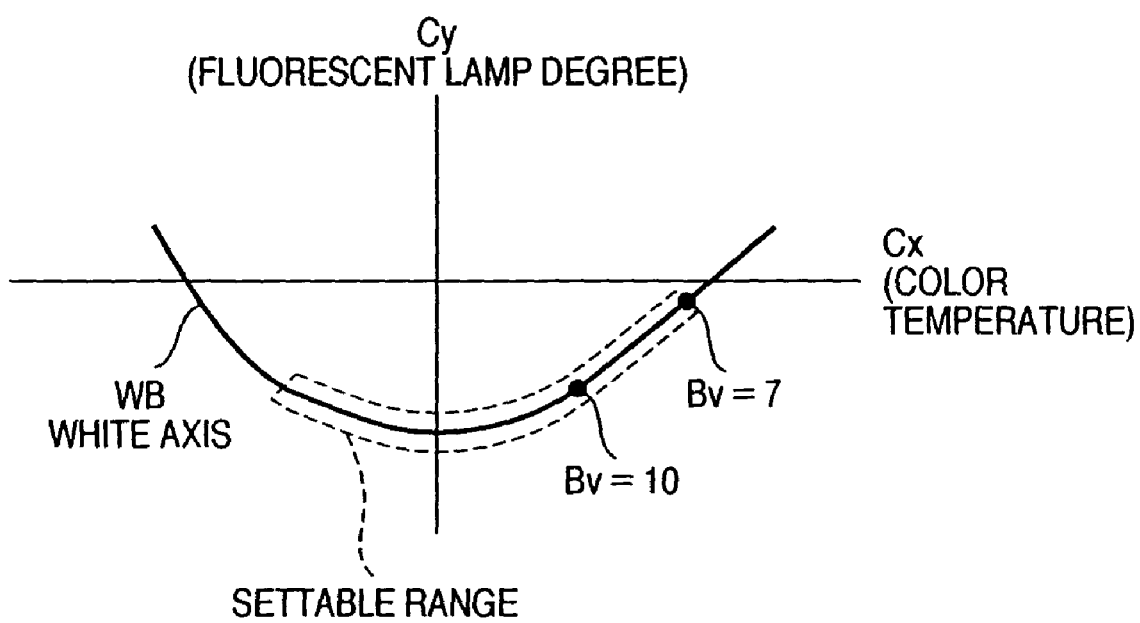
FIG. 4 is a graph showing conventional WB processing.
Figure 5:
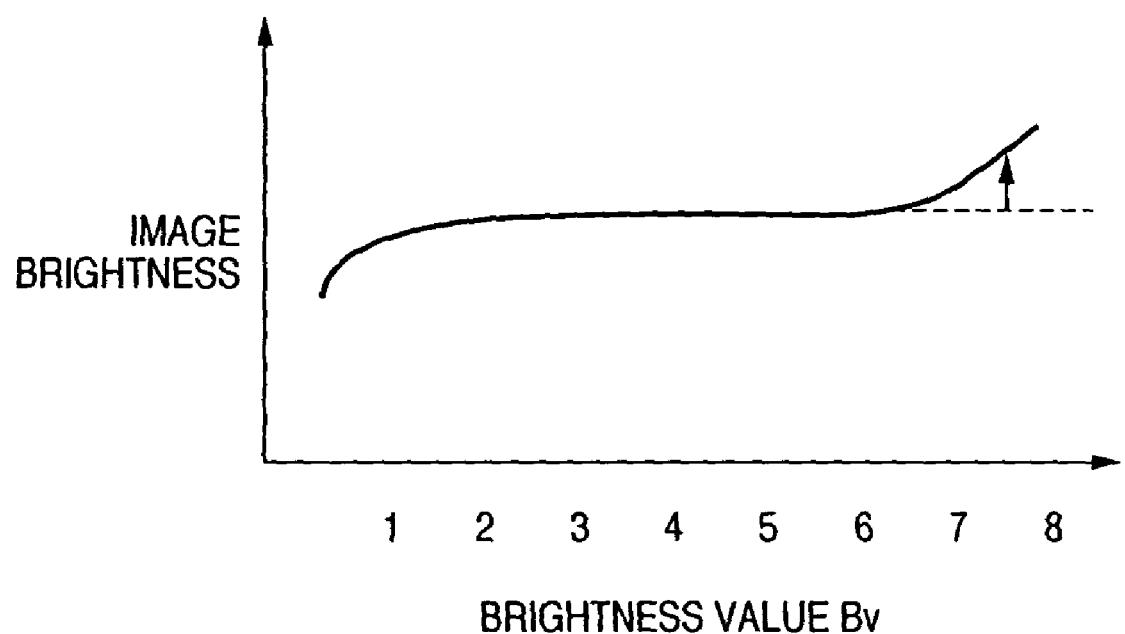
FIG. 5 is a graph showing conventional exposure value setting processing.

The exposure value setting calculation unit 123 calculates the setting of the exposure value on the basis of the second brightness value Bv' calculated by the brightness value correction unit 121 so as to attain an exposure value having a relation as shown in FIG. 5. The system controller 110 controls the optical system 115 in accordance with the exposure value setting calculated by the exposure value setting calculation unit 123, and controls the exposure value of the CCD image sensing element 101 to a value which considers the second brightness value (step S4). More specifically, the image sensing apparatus 100 can appropriately execute high-brightness luminance increasing processing as shown in FIG. 5 regardless of whether the ND filter is ON/OFF. The WB control unit 122 calculates a white balance control value shown in FIG. 4 on the basis of the second brightness value Bv' calculated by the brightness value correction unit 121.

When the user presses the shutter button 113, an object image is formed on the image sensing plane of the CCD image sensing element 101 at the exposure value set in step S4 under the control of the system controller 110 (step S5). At this time, the CCD image sensing element 101 outputs a CCD output signal corresponding to the object image formed on the image sensing plane. The CDS-A/D circuit 102 converts a CCD output signal into image sensing data. The DSP circuit 105 performs, via the memory controller 106 and memory 103, signal processing (luminance signal processing and color signal processing) of converting image sensing data into image data. At this time, the DSP circuit 105 executes white balance processing on the basis of the white balance control value calculated by the WB control unit 122 (step S6).

The JPEG processing circuit 104 performs JPEG compression processing for image data which is output from the DSP circuit and input via the memory controller 106, and outputs JPEG image data (step S7). The system controller 110 writes the JPEG image data output from the JPEG processing circuit 104 in the card memory 111 via the memory controller 106 (step S8). As described above, the image sensing apparatus 100 can calculate a proper brightness value regardless of insertion/removal of the ND filter. White balance processing and exposure value setting processing using the brightness value can be performed more accurately.

Concrete examples of processes in step S1 to S3 will be described.

Figure 3A:
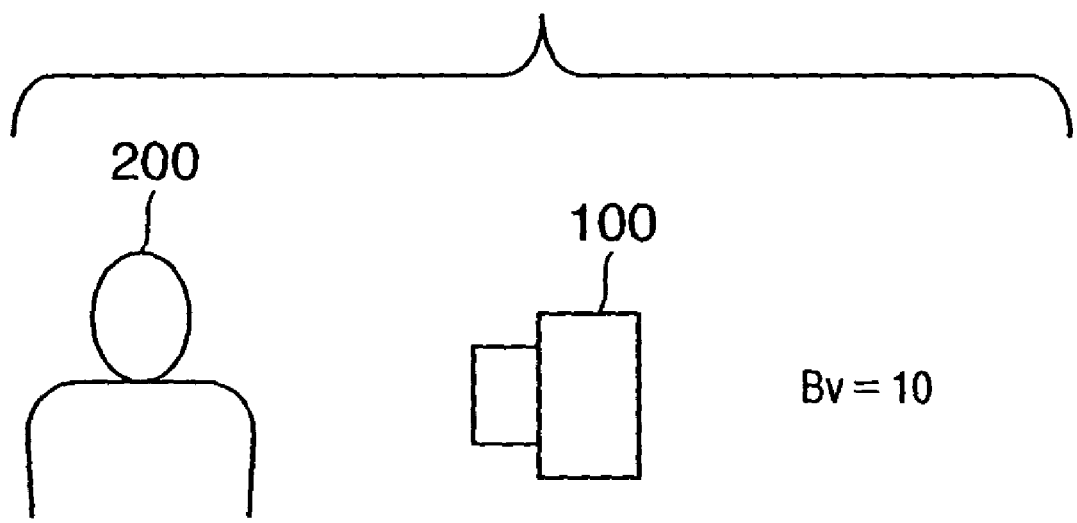
FIGS. 3A and 3B are views showing a concrete example when the first brightness value is corrected by processing of a brightness value correction unit 121 shown in FIG. 1.
Figure 3B:
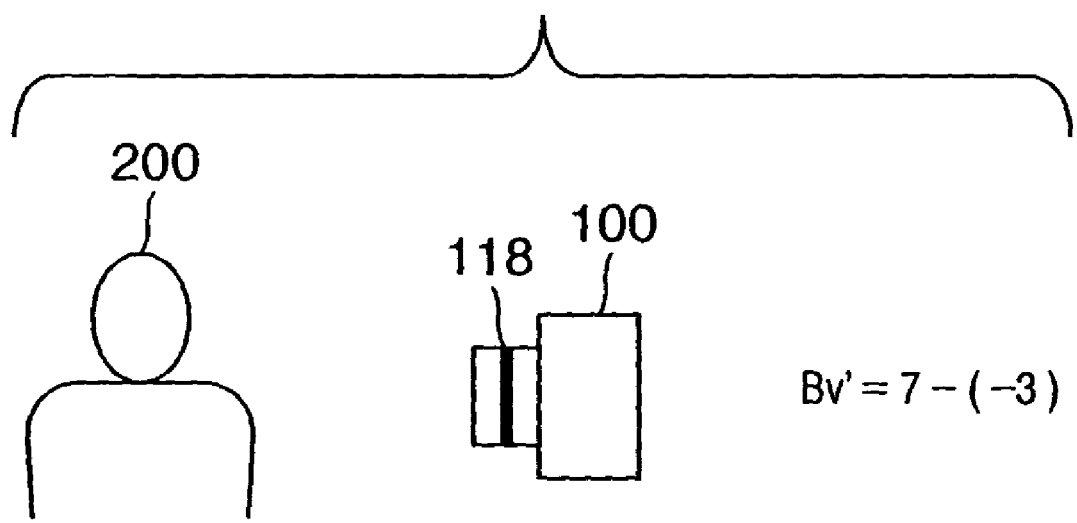

FIGS. 3A and 3B are views showing a concrete example when the first brightness value is corrected by processing of the brightness value correction unit 121 shown in FIG. 1. Assume that correct exposure is obtained at an F-number of F5.6 (aperture value Av=5), a shutter speed of 1/1000 (time value Tv=10), and film speed of ISO 100 (speed value Sv=5) in an ND filter "OFF" state, as shown in FIG. 3A. In this case, the brightness value calculation unit 120 calculates the first brightness value Bv of an object 200=5+10−5=10. Since the ND filter is OFF, the brightness value correction unit 121 outputs the first brightness value Bv without any correction.

The first brightness value Bv is used in processes by the WB control unit 122 and exposure value setting calculation unit 123.

As shown in FIG. 3B, the ND filter is set ON by the ND filter mechanism 118 for the same object 200 (step S1). Because of the neutral density of the ND filter=3, the system controller 110 controls the optical system 115 so as to attain a proper exposure value, thereby obtaining an F-number of F5.6 (aperture value Av=5) and a shutter speed of 1/128 (time value Tv=7). The brightness value calculation unit 120 calculates the first brightness value Bv of the object $200=5+7-5=7$ in accordance with equation (1) (step S2).

Because of the neutral density=3, the brightness value correction unit 121 calculates the second brightness value $Bv'=7-(-3)=10$ by correcting the first brightness value Bv=7 calculated by the brightness value calculation unit 120 (step S3).

As described above, when the ND filter is ON, the brightness value correction unit 121 can calculate the second brightness value Bv'=10 which is corrected to the same value as the first brightness value Bv=10 obtained when the ND filter is OFF. The WB control unit 122 and exposure value setting calculation unit 123 can white balance control and exposure value setting using a correct brightness value regardless of whether the ND filter is ON/OFF. Since the calculated value of the brightness value Bv does not change between the "ON" and "OFF" states of the ND filter for the same object, image data generated by the image sensing apparatus 100 via exposure value setting and white balance processing does not change.

In the above-described embodiment, the image sensing apparatus 100 is a digital still camera. However, the present invention is not limited to this, and may be preferably applied to a video camera or a camera for a personal computer. The image sensing element is not limited to the above-mentioned CCD image sensing element, and the image sensing apparatus may adopt a CMOS image sensor or the like. The above-described embodiment employs an ND filter as an optical filter, but the present invention is not limited to this. When another type of optical filter is used, the influence of the optical filter on calculation of the brightness value Bv is corrected by the brightness value correction unit 121.

The object of the present invention is also achieved when a recording medium (or storage medium) which stores a program for realizing the functions of the above-described embodiment is supplied to an image sensing system or image sensing apparatus, and the computer of the image sensing system or image sensing apparatus reads out and executes the program stored in the recording medium. The functions of the above-described embodiment are also realized when an OS (Operating System) or the like running on the computer performs part or all of actual processing on the basis of the instructions of the program read out by the computer.

The embodiment of the present invention has been described in detail above with reference to the accompanying drawings. However, a practical arrangement is not limited to the embodiment, and also includes a design or the like which does not depart from the spirit and scope of the present invention.

As has been described above, according to the image sensing apparatus, image sensing method, recording medium, and program of the embodiment, the first brightness value representing the brightness of part or all of an object which is imaged on the image sensing element is calculated. The second brightness value is calculated by correcting the calculated first brightness value on the basis of the light reduction amount generated by inserting the optical filter. Control of the optical system and/or control of signal processing of generating image data from an image sensing signal output from the image sensing element is performed using the second brightness value. An image can be sensed in consideration of the light reduction amount generated by inserting the optical filter. In other words, an image can be sensed in consideration of the influence of inserting/removing the optical filter. The same image can be generated regardless of insertion/removal of the optical filter.

The present invention is not limited to the above embodiment and various changes and modifications can be made within the spirit and scope of the present invention. Therefore, to apprise the public of the scope of the present invention the following claims are made.

What is claimed is:

1. An image sensing apparatus having at least a filter insertion/removal device which is operated by a user and inserts and removes an optical filter for reducing a light quantity to an image sensing element serving as an optical system, comprising:
   a signal processing device which performs signal processing so as to generate image data from an image sensing signal output from the image sensing element;
   a brightness value calculation device which calculates a brightness value representing a brightness of part or all of an object which is imaged on the image sensing element;
   a brightness value correction device which calculates a second brightness value by correcting a first brightness value on the basis of a difference between the first brightness value and a light reduction amount generated by inserting the optical filter by the filter insertion/removal device operated by the user, wherein the first brightness value is calculated by said brightness value calculation device in a case that the optical filter is inserted by the filter insertion/removal device operated by the user; and
   a control device which controls the signal processing in said signal processing device by using the second brightness value.

2. The apparatus according to claim 1, wherein said control of the signal processing includes control of white balance processing.

3. An image sensing apparatus having at least a filter insertion/removal device which is operated by a user and inserts and removes an optical filter for reducing a light quantity to an image sensing element serving as an optical system, comprising:
   a signal processing device which performs signal processing so as to generate image data from an image sensing signal output from the image sensing element;
   a brightness value calculation device which calculates a brightness value representing a brightness of part or all of an object which is imaged on the image sensing element;
   a brightness value correction device which calculates a second brightness value by correcting a first brightness value on the basis of a difference between the first brightness value and a light reduction amount generated by inserting the optical filter by the filter insertion/removal device operated by the user, wherein the first brightness value is calculated by said brightness value calculation device in a case that the optical filter is inserted by the filter insertion/removal device operated by the user; and
   a control device which controls an optical system by using the second brightness value.

4. The apparatus according to claim 3, wherein said control of the optical system includes control of an exposure value to the image sensing element.

5. The apparatus according to claim 4, wherein the optical system further comprises an aperture device which changes an aperture diameter, and control of the exposure value includes control of the aperture diameter of the aperture device.

6. The apparatus according to claim 1, wherein the optical filter includes an ND filter.

7. The apparatus according to claim 1, wherein said brightness value calculation device calculates the first brightness value on the basis of an aperture value determined in accordance with an aperture diameter of an aperture device, a time value determined in accordance with a time during which an object image is formed on the image sensing element, and a sensitivity of the image sensing element.

8. An image sensing method using an image sensing apparatus having at least a filter insertion/removal device which is operated by a user and inserts and removes an optical filter for reducing a light quantity to an image sensing element serving as an optical system, comprising:
 a first step of calculating a brightness value representing a brightness of part or all of an object which is imaged on the image sensing element;
 a second step of calculating a second brightness value by correcting a first brightness value calculated in the first step on the basis of a difference between the first brightness value and a light reduction amount generated by inserting the optical filter by the filter insertion/removal device operated by the user, wherein the first brightness value is calculated by said first step in a case that the optical filter is inserted by the filter insertion/removal device operated by the user; and
 a third step of controlling, by using the second brightness value calculated in the second step, signal processing of generating image data from an image sensing signal output from the image sensing element.

9. The method according to claim 8, wherein control of the signal processing in the third step includes control of white balance processing.

10. An image sensing method using an image sensing apparatus having at least a filter insertion/removal device which is operated by a user and inserts and removes an optical filter for reducing a light quantity to an image sensing element serving as an optical system, comprising:
 a first step of calculating a brightness value representing a brightness of part or all of an object which is imaged on the image sensing element;
 a second step of calculating a second brightness value by correcting a first brightness value calculated in the first step on the basis of a difference between the first brightness value and a light reduction amount generated by inserting the optical filter by the filter insertion/removal device operated by the user, wherein the first brightness value is calculated by said first step in a case that the optical filter is inserted by the filter insertion/removal device operated by the user; and
 a third step of controlling an optical system by using the second brightness value calculated in the second step.

11. The method according to claim 10, wherein control of the optical system in the third step includes control of an exposure value to the image sensing element.

12. A non-transitory computer readable recording medium which records a program for controlling an image sensing apparatus having at least a filter insertion/removal device which is operated by a user and inserts and removes an optical filter for reducing a light quantity to an image sensing element serving as an optical system, the program causing a computer in the image sensing apparatus to execute:
 a first step of calculating a brightness value representing a brightness of part or all of an object which is imaged on the image sensing element;
 a second step of calculating a second brightness value by correcting a first brightness value calculated in the first step on the basis of a difference between the first brightness value and a light reduction amount generated by inserting the optical filter by the filter insertion/removal device operated by the user, wherein the first brightness value is calculated by said first step in a case that the optical filter is inserted by the filter insertion/removal device operated by the user; and
 a third step of controlling, by using the second brightness value calculated in the second step, signal processing of generating image data from an image sensing signal output from the image sensing element.

13. The medium according to claim 12, wherein control of the signal processing in the third step includes control of white balance processing.

14. A non-transitory computer-readable recording medium which records a program for controlling an image sensing apparatus having at least a filter insertion/removal device which is operated by a user and inserts and removes an optical filter for reducing a light quantity to an image sensing element serving as an optical system, the program causing a computer in the image sensing apparatus to execute:
 a first step of calculating a brightness value representing a brightness of part or all of an object which is imaged on the image sensing element;
 a second step of calculating a second brightness value by correcting a first brightness value calculated in the first step on the basis of a difference between the first brightness value and a light reduction amount generated by inserting the optical filter by the filter insertion/removal device operated by the user, wherein the first brightness value is calculated by said first step in a case that the optical filter is inserted by the filter insertion/removal device operated by the user; and
 a third step of controlling an optical system by using the second brightness value calculated in the second step.

15. The medium according to claim 14, wherein control of the optical system in the third step includes control of an exposure value to the image sensing element.

16. A non-transitory computer readable medium having stored there on a program for causing a computer to execute a method of controlling an image sensing apparatus having at least a filter insertion/removal device which is operated by a user and inserts and removes an optical filter for reducing a light quantity to an image sensing element serving as an optical system, the method comprising:
 a first step of calculating a first brightness value representing a brightness of part or all of an object which is imaged on the image sensing element;
 a second step of calculating a second brightness value by correcting a first brightness value calculated in the first step on the basis of a difference between the first brightness value and a light reduction amount generated by inserting the optical filter by the filter insertion/removal device operated by the user, wherein the first brightness value is calculated by said first step in a case that the optical filter is inserted by the filter insertion/removal device operated by the user; and
 a third step of controlling, by using the second brightness value calculated in the second step, signal processing of generating image data from an image sensing signal output from the image sensing element.

17. A non-transitory computer readable medium having stored thereon the program according to claim 16, wherein control of the signal processing in the third step of the method includes control of white balance processing.

18. A non-transitory computer readable medium having stored thereon a program for causing a computer to execute a method of controlling an image sensing apparatus having at least a filter insertion/removal device which is operated by a user and inserts and removes an optical filter for reducing a light quantity to an image sensing element serving as an optical system, the method comprising:

a first step of calculating a first brightness value representing a brightness of part or all of an object which is imaged on the image sensing element;

a second step of calculating a second brightness value by correcting a first brightness value calculated in the first step on the basis of a difference between the first brightness value and a light reduction amount generated by inserting the optical filter by the filter insertion/removal device operated by the user, wherein the first brightness value is calculated by said first step in a case that the optical filter is inserted by the filter insertion/removal device operated by the user; and a third step of controlling an optical system by using the second brightness value calculated in the second step.

19. A non-transitory computer readable medium having stored thereon the program according to claim 18, wherein control of the optical system in the third step of the method includes control of exposure value to the image sensing element.

* * * * *